(12) United States Patent
Bruenig et al.

(10) Patent No.: US 12,719,056 B2
(45) Date of Patent: Aug. 25, 2026

(54) LITHIUM METAL PHOSPHATE, ITS PREPARATION AND USE

(71) Applicant: EPSILON CARBON PRIVATE LTD., Fort Mumbai (IN)

(72) Inventors: Christian Bruenig, Reading (GB); Noelia Cabello, Reading (GB); James Cookson, Reading (GB); Mark Copley, Reading (GB); Andreas Laumann, Reading (GB)

(73) Assignee: Epsilon Carbon Private Ltd., Mumbai (IN)

( * ) Notice: Subject to any disclaimer, the term of this patent is extended or adjusted under 35 U.S.C. 154(b) by 898 days.

(21) Appl. No.: 17/594,048

(22) PCT Filed: Feb. 14, 2020

(86) PCT No.: PCT/GB2020/050351
§ 371 (c)(1),
(2) Date: Sep. 30, 2021

(87) PCT Pub. No.: WO2020/208331
PCT Pub. Date: Oct. 15, 2020

(65) Prior Publication Data

US 2022/0158188 A1 May 19, 2022

(30) Foreign Application Priority Data

Apr. 11, 2019 (GB) .................................... 1905177

(51) Int. Cl.
*H01M 4/58* (2010.01)
*H01M 4/04* (2006.01)
(Continued)

(52) U.S. Cl.
CPC ....... *H01M 4/5825* (2013.01); *H01M 4/0419* (2013.01); *H01M 4/0471* (2013.01); *H01M 4/583* (2013.01); *H01M 10/0525* (2013.01)

(58) Field of Classification Search
CPC ............ H01M 4/0419; H01M 4/0471; H01M 4/5825; H01M 4/583; H01M 10/0525
See application file for complete search history.

(56) References Cited

U.S. PATENT DOCUMENTS

2007/0031732 A1* 2/2007 Chiang ................ H01M 4/136 429/231.95
2010/0233540 A1 9/2010 Choy et al.
(Continued)

FOREIGN PATENT DOCUMENTS

CN 102186768 A 9/2011
CN 102186769 A 9/2011
(Continued)

OTHER PUBLICATIONS

Kulka et al.; "Evidence for AI doping in lithium sublattice of $LifePO_4$"; Solid State Ionics; vol. 270; 2015; p. 33-38.

*Primary Examiner* — Matthew T Martin
*Assistant Examiner* — Ankith R Sripathi
(74) *Attorney, Agent, or Firm* — Baker Hostetler

(57) ABSTRACT

The present invention provides carbon-coated lithium metal phosphate which is doped with aluminium such that the aluminium content is between 300 and 5000 ppm and which has a BET surface area of less than or equal to 15 $m^2/g$. The carbon-coated lithium metal phosphate finds use as a cathode active material and provides improved electrochemical performance at low temperatures.

14 Claims, 1 Drawing Sheet

(51) Int. Cl.
*H01M 4/583* (2010.01)
*H01M 10/0525* (2010.01)

(56) References Cited

U.S. PATENT DOCUMENTS

| | | | | |
|---|---|---|---|---|
| 2010/0261060 | A1* | 10/2010 | Choy | H01M 4/5825 436/127 |
| 2010/0327223 | A1* | 12/2010 | Zaghib | H01M 4/5825 252/182.1 |
| 2011/0091772 | A1 | 4/2011 | Mishima et al. | |
| 2012/0237425 | A1 | 9/2012 | Nishio et al. | |
| 2014/0138591 | A1* | 5/2014 | Yoon | H01M 4/525 429/221 |
| 2014/0319413 | A1 | 10/2014 | Song et al. | |
| 2020/0028174 | A1* | 1/2020 | Ahn | H01M 10/0525 |

FOREIGN PATENT DOCUMENTS

| | | | | |
|---|---|---|---|---|
| CN | 102299327 | A | 12/2011 | |
| CN | 103165882 | A | 6/2013 | |
| CN | 103647076 | A | 3/2014 | |
| CN | 108520947 | A | 9/2018 | |
| EP | 2360117 | B | 8/2011 | |
| JP | 2006-261060 | A | 9/2006 | |
| JP | 2009-263222 | A | 11/2009 | |
| JP | 2013-062083 | A | 4/2013 | |
| JP | 2015-506897 | A | 3/2015 | |
| JP | 2016-517383 | A | 6/2016 | |
| WO | 2005/051840 | A1 | 6/2005 | |
| WO | WO 2014/140323 | A1 | 9/2014 | |
| WO | WO-2018174616 | A1 * | 9/2018 | H01M 4/62 |

* cited by examiner

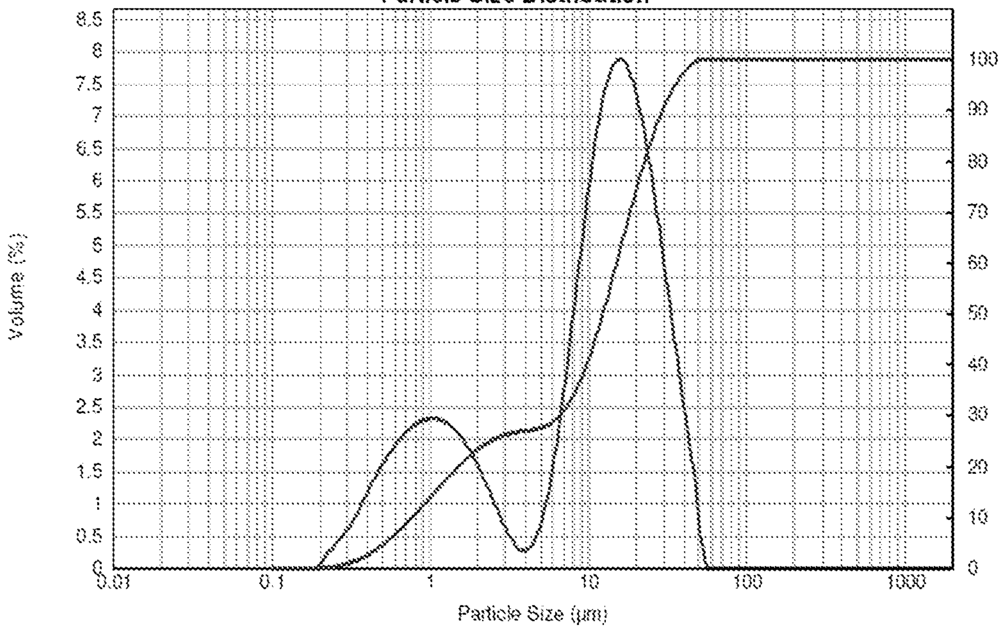
Particle Size Distribution
Volume (%)
Particle Size (μm)
0.01
0.1
1
10
100
1000
0
0.5
1
1.5
2
2.5
3
3.5
4
4.5
5
5.5
6
6.5
7
7.5
8
8.5
10
20
30
40
50
60
70
80
90
100

LITHIUM METAL PHOSPHATE, ITS PREPARATION AND USE

FIELD OF THE INVENTION

The present invention relates to lithium metal phosphate materials, their preparation and use as a cathode material in secondary lithium ion batteries.

BACKGROUND OF THE INVENTION

Lithium metal phosphate materials, such as lithium iron phosphate (LFP), have found widespread use as cathode materials in secondary lithium ion batteries. This is due to the advantageous properties of batteries incorporating such materials, including high power density and good safety profile. The lithium metal phosphate materials used in such batteries are predominantly in the form of particles which are coated with electrically conductive carbon, and are typically produced by melting processes, hydrothermal processes or solid-state processes.

The electrochemical performance of batteries incorporating lithium metal phosphate materials is significantly reduced at low temperatures due to a number of factors including increased internal resistance. This can be a significant issue for certain battery applications, such as batteries used to power starter motors, for example 12/48 V starter batteries.

There remains a need for enhanced lithium metal phosphate materials which exhibit improved electrochemical performance at low temperatures.

SUMMARY OF THE INVENTION

The present inventors have found that the electrochemical performance of lithium metal phosphate at low temperatures can be significantly improved by the provision of at least partially agglomerated carbon-coated lithium metal phosphate with a low surface area, and which comprises aluminium as a dopant.

Accordingly, in a first preferred aspect, the present invention provides carbon-coated lithium metal phosphate at least partially in the form of secondary particles formed by agglomeration of primary particles, the carbon-coated lithium metal phosphate satisfying the following requirements:

(i) the lithium metal phosphate has a formula:

$$Li_a(Fe_{1-x}M_x)PO_4$$

in which $0.8 \leq a \leq 1.2$, $0 \leq x \leq 0.1$ and M is one or more selected from Mn, Ni, Co, Mg, and B; and wherein the lithium metal phosphate is doped with aluminium such that the carbon-coated lithium metal phosphate has an aluminium content of between 300 and 5000 ppm;

(ii) the carbon-coated lithium metal phosphate has a BET surface area of less than or equal to 15 $m^2/g$.

The present inventors have found that when such materials are incorporated into an electrochemical cell the internal resistance at low temperature is significantly reduced in comparison to state-of-the-art materials.

Such materials may be advantageously produced via a hydrothermal method. Therefore, in a second preferred aspect, there is provided a process for the preparation of carbon-coated lithium metal phosphate as described herein, the process comprising the steps of:

(i) combining an iron (II) source with at least one lithium source, at least one phosphate source, at least one aluminium source, and optionally at least one source of M, to form a precursor mixture;

(ii) obtaining lithium metal phosphate from the precursor mixture under hydrothermal conditions;

(iii) mixing the lithium metal phosphate with a carbon source, and spray drying the mixture; and (iv) heating the lithium metal phosphate and carbon source to form the carbon-coated lithium metal phosphate The present invention further provides carbon-coated lithium metal phosphate obtained or obtainable by the process of the second aspect.

In a further preferred aspect, the present invention provides use of carbon-coated lithium metal phosphate of the present invention for the preparation of a cathode of a secondary lithium ion battery. In a further preferred aspect, the present invention provides a cathode which comprises carbon-coated lithium metal phosphate of the present invention. In a further preferred aspect, the present invention provides a secondary lithium ion battery, comprising a cathode which comprises carbon-coated lithium metal phosphate of the present invention. The battery typically further comprises an anode and an electrolyte.

BRIEF DESCRIPTION OF THE DRAWINGS

FIG. 1 shows the particle size distribution of the material of Example 2.

DETAILED DESCRIPTION

Preferred and/or optional features of the invention will now be set out. Any aspect of the invention may be combined with any other aspect of the invention unless the context demands otherwise. Any of the preferred and/or optional features of any aspect may be combined, either singly or in combination, with any aspect of the invention unless the context demands otherwise.

The present invention provides carbon-coated lithium metal phosphate at least partially in the form of secondary particles formed by agglomeration of primary particles. The lithium metal phosphate has the formula:

$$Li_a(Fe_{1-x}M_x)PO_4$$

in which $0.8 \leq a \leq 1.2$, $0 \leq x \leq 0.1$ and M is one or more selected from Mn, Ni, Co, Mg, and B; and wherein the lithium metal phosphate is doped with aluminium such that the carbon-coated lithium metal phosphate has an aluminium content of between 300 and 5000 ppm.

The value for a is greater than or equal to 0.8. It may be greater than or equal to 0.9, or greater than or equal to 0.95. The value for a is less than or equal to 1.2. It may be less than or equal to 1.1, or less than or equal to 1.05. Typically, $0.9 \leq a \leq 1.1$, or $0.95 \leq a \leq 1.05$. The value for a may be 1, or about 1.

The value for x is greater than or equal to 0, it may be greater than or equal to 0.01, or greater than equal to 0.02. The value for x is less than or equal to 0.1. It may be less than or equal to 0.075, or less than or equal to 0.05. It may be preferred that $0 \leq x \leq 0.05$.

Furthermore, it may be preferred that the value of x is 0, and the lithium metal phosphate has the formula $Li_aFePO_4$ in which $0.8 \leq a \leq 1.2$, or $LiFePO_4$.

M is one or more selected from Mn, Ni, Co, Mg, and B. It may be preferred that M is Mn, or that M is one or more selected from Ni, Co, Mg, and B, or that M is one or more selected from Ni and Co.

The lithium metal phosphate is doped with aluminium such that the carbon-coated lithium metal phosphate has an aluminium content of between 300 and 5000 ppm. The aluminium content is greater than or equal to 300 ppm. The inclusion of aluminium at an amount greater than or equal to 300 ppm has surprisingly been found by the present inventors to provide lithium metal phosphates which have a reduced internal resistance when incorporated into an electrochemical cell. The aluminium content is less than or equal to 5000 ppm. It has been found that levels of aluminium greater than 5000 ppm lead to a reduced specific capacity.

It may be preferred that the aluminium content is between 500 and 5000 ppm, such as between 500 and 4500 ppm, 600 and 4000 ppm, 700 and 3500 ppm, 800 and 3500 ppm, 900 and 3500 ppm, 1000 and 3500 ppm, 1200 and 3500 ppm, or 1400 and 3500 ppm.

The aluminium content of the carbon-coated lithium metal phosphate may be measured, for example, by inductively coupled plasma optical emission spectroscopy (ICP-OES). It has been found that when using the process as described herein that at least a part of the aluminium dopant is incorporated into the phospho-olivine crystal lattice of the lithium metal phosphate.

The carbon-coated lithium metal phosphate is at least partially in the form of secondary particles formed by agglomeration of primary particles. Preferably, the majority or substantially all of the carbon-coated lithium metal phosphate is in the form of secondary particles formed by agglomeration of primary particles. By the majority of the carbon-coated lithium metal phosphate it is meant that secondary particles are present in an amount greater than 50 vol % of the composition. The present inventors have found that the formation of agglomerated particles, in combination with the presence of aluminium, leads to an enhancement of the internal resistance properties of the carbon-coated lithium metal phosphates.

The carbon-coated lithium metal phosphate has a BET surface area less than or equal to 15 $m^2/g$. The materials of the present invention are surprisingly able to achieve low resistivity in combination with a low BET surface area. It has been found by the present inventors that the resistance of the at least partially agglomerated carbon-coated lithium metal phosphates with a surface area less than or equal to 15 $m^2/g$ is lower than that of unagglomerated materials having a similar Al-content, but with higher BET surface area. A surface area less than or equal to 15 $m^2/g$ is also beneficial when the lithium metal phosphate is used to form an electrode as a reduced amount of binder and solvent is required to form a suitable electrode slurry. The lower limit of BET surface area is not particularly limited in the present invention but typically the BET surface area is greater than 7 $m^2/g$. The carbon-coated lithium metal phosphate may therefore have a BET surface area between 7 and 15 $m^2/g$, such as between 8 and 14 $m^2/g$, or between 7 and 13 $m^2/g$ or between 8 and 12 $m^2/g$.

The lithium metal phosphate may have a crystallite size of at least 100 nm when determined by Rietveld analysis of X-ray Diffraction (XRD) data. The upper limit on the crystallite size is not particularly limited, but may be 500 nm or less, 250 nm or less, 200 nm or less, or 150 nm or less. Larger observed crystallite sizes can indicate a higher degree of crystallinity and fewer crystalline defects, which can enhance lithium ion conduction within the lithium metal phosphate material thereby enhancing electrochemical performance.

Typically, the carbon-coated lithium metal phosphate comprises lithium phosphate in an amount of 0.25 to 3.5 wt % based on the total weight of the carbon coated lithium metal phosphate. This helps to ensure that the carbon-coated lithium metal phosphates are not deficient in lithium. The presence of lithium phosphate may be determined by X-ray Diffraction (XRD) and the amount of lithium phosphate determined by ICP-OES from a buffer solution.

Typically, particle size distribution of the carbon-coated lithium metal phosphate is such that the $D_{50}$ is greater than 8 μm, greater than 9 μm, or greater then 10 μm. The $D_{50}$ may be between 8 and 20 μm, or between 8 and 15 μm. The term $D_{50}$ corresponds to the particle size value below which 50% by volume of the total particles in a particular sample lie. The $D_{50}$ may be determined using a laser diffraction method (e.g. using a Malvern Mastersizer 2000).

It may be preferred that the carbon-coated lithium metal phosphate is provided as a mixture of two particle size populations, a first population in a range of 4 to 80 μm (coarse particles) and a second population in the range 0.1 to 4 μm (fine particles). The provision of a material with such a distribution of particle sizes can enable closer packing of the secondary particles and can lead to improved electrode density. Typically, the ratio of the volume of fine particles:coarse particles is 3:97 to 50:50, or preferably 20:80 to 40:60, such as around 30:70.

The carbon-coated lithium metal phosphate is typically prepared by a hydrothermal process. Such a method involves the combination of an iron (II) source with at least one lithium source, at least one phosphate source, at least one aluminium source, and optionally at least one source of M, and obtaining particulate lithium metal phosphate under hydrothermal conditions.

Suitable iron (II) sources include iron sulphate ($FeSO_4$), typically in the form of a hydrate, and iron oxalate.

Suitable lithium sources include lithium carbonate ($Li_2CO_3$), lithium hydrogen phosphate ($Li_2HPO_4$), lithium hydroxide (LiOH), lithium fluoride (LiF), lithium chloride (LiCl), lithium bromide (LiBr), lithium iodide (LiI), lithium phosphate ($Li_3PO_4$) or mixtures thereof. Lithium hydroxide may be preferred.

Suitable phosphate sources include phosphoric acid, metaphosphoric acid, pyro-phosphoric acid, triphosphoric acid, tetraphosphoric acid, hydrogen phosphates or dihydrogen phosphates, such as ammonium phosphate or ammonium dihydrogen phosphate, lithium phosphate or iron phosphate or any desired mixtures thereof. Phosphoric acid is particularly preferred.

Suitable sources of M, if applicable, include sulphates and/or oxides of M or mixtures thereof. It will be understood by the skilled person that M may also be present in the iron (II) source, the lithium source, the phosphate source, or the aluminium source (typically the iron (II) source), and therefore an additional source of M may not need to be added to achieve the desired level of M in the lithium metal phosphate.

Suitable aluminium sources include aluminium hydroxide ($Al(OH)_3$), aluminium chloride ($AlCl_3$), aluminium sulphate ($Al_2(SO_4)_3*xH_2O$ (typically $0 \leq x \leq 18$)), and aluminium oxide ($Al_2O_3$). Aluminium hydroxide or aluminium sulphate may be particularly preferred.

In the context of the present invention, the term obtaining particulate lithium metal phosphate from the precursor mixture under hydrothermal conditions is to be understood as treatment of the precursor mixture at a temperature above room temperature and a steam pressure of above 1 bar. The hydrothermal treatment can be carried out in a manner known to the person skilled in the art, for example as described in WO2005/051840 the content of which is hereby incorporated by reference. It is preferable for the hydrothermal treatment to be carried out at temperatures of between 100 to 250° C., in particular from 100 to 180° C. and at a steam pressure of from 1 bar to 40 bar, in particular at a steam pressure from 1 bar to 10 bar. The precursor mixture is typically reacted in a tightly closed or pressure-resistant vessel. The reaction preferably takes place in an inert or protective gas atmosphere. Examples of suitable inert gases include nitrogen, argon, carbon dioxide, carbon monoxide or mixtures thereof. The hydrothermal treatment may, for example, be carried out for 0.5 to 15 hours, in particular for 6 to 11 hours. Purely as a non-limiting example, the following specific conditions may be selected: 1.5 h heat-up time from 50° C. (temperature of the precursor mixture) to 160° C., 10 h hydrothermal treatment at 160° C., 3 h cooling from 160° C. to 30° C.

The lithium metal phosphate is carbon-coated. In order to form the carbon coating, the particulate lithium metal phosphate formed by the hydrothermal process is typically mixed with a carbon source and then spray dried prior to a heating, or calcination step. The nature of the carbon source is not particularly limited in the present invention. The carbon source is typically a carbon-containing compound which decomposes to a carbonaceous residue when exposed to the calcination step. For example, the carbon source may be one or more of starch, maltodextrin, gelatine, polyol, sugar (such as mannose, fructose, sucrose, lactose, glucose, galactose), and carbon-based polymers such as polyacrylate, polyvinyl acetate (PVA), glucono delta-lactone (GDL), and polyvinyl butyrate (PVB). Alternatively, the carbon source may be elemental carbon, such as one or more of graphite, carbon black, acetylene black, carbon nanotubes and carbon fibres (such as vapour grown carbon fibres, VGCF). Lactose or maltodextrin may be particularly preferred.

The amount of carbon source added is not particularly limited in the present invention. For example, the amount of carbon source added may be selected to yield carbon-coated lithium metal phosphate with a carbon content of 1 to 5 wt %, for example 1.5 to 3.5 wt %. The amount of carbon source added may be in the range from 7 to 22 wt % based on the weight of the particulate lithium metal phosphate, for example from 10 to 18 wt %, depending on the nature of the carbon precursor, and its carbonisation yield.

The skilled person will understand that the carbon source may be combined with the particulate lithium metal phosphate by a number of means. For example, the lithium metal phosphate may be mixed with the carbon source in the presence of a solvent, such as water, and the mixture then spray dried. It will also be understood by the skilled person that in some cases it may be preferable that the carbon source is added to the precursor mixture prior to hydrothermal treatment. In such a case, it will be understood that the addition of a carbon source in step (iii) of the process may be no longer required.

In the heating step (iv), the particulate lithium metal phosphate and carbon source are heated to provide the particulate carbon-coated lithium metal phosphate. The heating step (v) performs two functions. Firstly, it results in pyrolysis of the carbon source to form a conductive carbon coating on the lithium metal phosphate particles. Secondly, to improve the crystallinity and/or to heal potential defects of the lithium metal phosphate crystals. Typically, the heating is carried out in an inert atmosphere, for example in an inert gas such as argon. It may alternatively be carried out in a reducing atmosphere. It is typically carried out at a temperature in the range from 550° C. to 800° C., e.g. from 630° C. to 780° C., or from 650° C. or 700° C. to 780° C. 750° C. is particularly suitable. Typically, the calcination is carried out for a period of 0.4 to 10 hours. The heating time depends on the scale of manufacture (i.e. where larger quantities are prepared, longer heating times may be preferred). At a commercial scale, 0.5 to 3 hours may be suitable, for example.

Following the pyrolysis step the carbon-coated lithium metal phosphate may be subjected to a sieving, or a milling and/or a sifting step to provide a material with the desired particle size distribution. It may be preferred that sifting is performed at a sifter speed range from 500 to 10000 rpm, and/or at a pressure from 0.25 to 5 bar.

The process of the present invention may further comprise the step of forming an electrode (typically a cathode) comprising the carbon-coated lithium metal phosphate. Typically, this is carried out by forming a slurry of the particulate carbon-coated lithium metal phosphate, applying the slurry to the surface of a current collector (e.g. an aluminium current collector), and optionally processing (e.g. calendaring) to increase the density of the electrode. The slurry may comprise one or more of a solvent, a binder and additional carbon material.

The process of the present invention may further comprise constructing a battery or electrochemical cell including the electrode comprising the carbon-coated lithium metal phosphate. The battery or cell typically further comprises an anode and an electrolyte. The battery or cell may typically be a secondary (rechargeable) lithium ion battery.

The present invention will now be described with reference to the following examples, which are provided to assist with understanding the present invention, and are not intended to limit its scope.

EXAMPLES

The Examples 1 and 2 and Comparative examples 1 to 5 were produced according to the following general method of hydrothermal preparation:

General Method

As described in WO2005/051840, a mixture of $FeSO_4$(22 kg), $LiOH.H_2O$ (10 kg), and $H_3PO_4$ (76%, 9 kg), in distilled water was subjected to hydrothermal treatment for 10 h at 160° C. The resulting precipitate was filtered, and the filter cake washed with water. The resulting solid was mixed with lactose (10.5 wt %) and water and then the mixture spray dried. The spray dried material was calcined in a rotary kiln at 750° C. under nitrogen atmosphere.

Comparative Example 1

Carbon-coated lithium iron phosphate was produced according to the general method described above. Following calcination, the formed material was milled to yield an unagglomerated powder.

Comparative Example 2

Carbon-coated lithium iron phosphate was produced according to the general method described above. Following calcination the formed material was sifted on a jet mill at 1 bar and 2100 rpm to yield a partially agglomerated material.

Comparative Example 3

The method of comparative example 1 was repeated with the addition of $Al(OH)_3$ (0.23 kg) prior to hydrothermal treatment to yield an aluminium doped material in the form of an unagglomerated powder.

Comparative Example 4

The method of comparative example 1 was repeated with the addition of $Al_2(SO_4)_3.xH_2O$ (0.16 kg) prior to hydrothermal treatment to yield an aluminium doped material in the form of an unagglomerated powder.

Comparative Example 5

Lithium carbonate, iron phosphate, polyvinyl butyral (PVB), and an aluminium source (Disperal (RTM) OS-1 (boehmite modified with p-toluene sulfonic acid, Sasol)) were mixed in the desired proportions and then subjected to high energy milling in iso-propanol for 8 hours (recirculating high energy mill charged with yttria stabilised zirconia (0.3mm) with 75% charge rate inside of the mill). The milling slurry was spray dried and calcined in a furnace (maximum temperature 710° C.).

Example 1

The method of comparative example 2 was repeated with the addition of $Al(OH)_3$ (0.23 kg) prior to hydrothermal treatment to yield an aluminium doped material in the form of a partially agglomerated material.

Example 2

The method of comparative example 2 was repeated with the addition of $Al_2(SO_4)_3.xH_2O$ (0.16 kg) prior to hydrothermal treatment to yield an aluminium doped material in the form of a partially agglomerated material.

Analytical Methods

BET Surface Area

The specific surface area of the carbon-coated lithium metal phosphates was determined using the Brunauer, Emmett and Teller (BET) method using a Gemini 2360 surface area analyser (Micromeritics).

Carbon Content

The carbon content of the carbon-coated lithium metal phosphate was measured using a Carbon/Sulphur Analyzer (Eltra CS2000).

Aluminium Content

The aluminium content was measured by ICP-OES. 0.1 g of carbon-coated lithium metal phosphate was dissolved in 10 ml of HCl (18.5%, aqueous) whilst heating to 80-90° C. for 2 h. After two hours in dissoluble carbon is filtered via a Teflon filter (1 μm) by means of a vacuum system. To the filtrate is added pure water up to a total volume of 100 ml. The solution is then analysed for aluminium content by ICP-OES at wavelengths of 308.215, 394.401 and 396.152 (comparing with a series of standard solutions at different Al concentrations). The aluminium content is calculated as the average of the aluminium content obtained by analysis of each wavelength.

Lithium Phosphate Content

Lithium phosphate content was calculated based on ICP-OES measurement of lithium and phosphate in a buffer solution of the lithium metal phosphate as follows:

A buffer solution is prepared by the dissolution of sodium acetate (49.3g) and acetic acid (0.74 g) in water (950 ml). 50 mg of lithium metal phosphate was combined with 20 ml of buffer solution. Subsequently, this solution is kept in a water bath for 15 minutes at 50° C. Then the sample is treated for one hour in an ultrasonic bath. The sample is filtered via a syringe filter. 0.2 ml of filtered material is filled up with 1 ml of HCl (18.5%) and with pure $H_2O$ to 10 ml. The solution was analysed by ICP-OES (at wavelength 670.784 nm (Li) and 213.618 (P)).

The resulting values were used to calculate the weight percentage of lithium phosphate in the lithium metal phosphate sample.

Particle Size Analysis

The volume particle size distribution (PSD) of the carbon-coated lithium metal phosphate was analysed by laser diffraction using a MALVERN Mastersizer 2000.

For unagglomerated materials (Comparative Examples 1, 3 and 4) samples of carbon-coated lithium metal phosphate (approx. 50 mg) were added to ethyl alcohol (approx. 20 mL) and subjected to ultrasonic treatment for a period of 5 minutes prior to PSD analysis.

For partially agglomerated materials (Comparative example 2 and Example 1 and 2) samples were placed on a vibrating plate and aspirated with an air pressure of 0.2 bar.

Crystallite Size

The crystallite size was determined by x-ray powder diffraction analysis using a Bruker D8 advance diffractometer (Davinci design, radiation=Cu Kα, (λ=1.5406+1.54439 Å)) using the following parameters:

Scan range 10 to 130 °2θ; Step size=0.022°; Scan mode=θ/θ coupled; Tube voltage, Current=40 kV, 40 mA; Temperature=Ambient; Detector Lynxeye-XE PSD, 0.0125° Ni Filter;

Crystallite Size and Lattice Parameter Measurements:

Software: Bruker-AXS TOPAS 5 (1999-2014)

Rietveld analysis: A complete-powder diffraction pattern fitting technique using a full structural model. Crystallite size calculated using the LVol-IB method.

Analytical Results

The lithium metal phosphate materials were analysed to determine BET surface area, carbon content, and aluminium content. The results are shown in Table 1. This data shows that the partially agglomerated materials (Comparative example 2, and Examples 1 and 2) have a lower BET surface area then the powder materials, whilst the carbon content of each sample is within the range 2-3 wt %. The inclusion of sources of aluminium into the hydrothermal process has increased the aluminium content of the carbon-coated lithium metal phosphate to within the range 300 to 5000 ppm.

The material of Comparative Example 5 produced by a wet milling method has a significantly higher BET surface area and lower crystallite size than the other materials tested.

TABLE 1

BET surface area, carbon and aluminium content of the lithium metal phosphate samples

| Example | BET ($m^2/g$) | C content (wt %) | Al content ppm | Crystallite size (nm) |
|---|---|---|---|---|
| Comparative Example 1 | 14 | 2.3 | 200 | 168 |
| Comparative Example 2 | 9 | 1.9 | 200 | 170 |

TABLE 1-continued

BET surface area, carbon and aluminium content of the lithium metal phosphate samples

| Example | BET ($m^2$/g) | C content (wt %) | Al content ppm | Crystallite size (nm) |
|---|---|---|---|---|
| Comparative Example 3 | 15.3 | 2.1 | 2400 | 154 |
| Comparative Example 4 | 15.5 | 2.3 | 990 | 156 |
| Comparative Example 5 | 20.4 | 1.9 | 6600 | 70 |
| Example 1 | 9.9 | 2.0 | 3400 | 113 |
| Example 2 | 10.0 | 2.0 | 1500 | 140 |

Further XRPD analysis of samples produced by the methods of Example 1 and Example 2 indicates that at least a part of the aluminium dopant is present within the phospho-olivine crystal lattice of the lithium metal phosphate.

PSD Distribution

Comparative Examples 3 and 4 and Examples 1 and 2 were analysed to determine their particle size distribution. The results of this analysis were as follows:

Comparative example 3—A particle size distribution with a $D_{50}$ of 0.4 μm

Comparative example 4—A particle size distribution with a $D_{50}$ of 0.5 μm

Example 1—A bimodal distribution with a $D_{50}$ of 11 μm

Example 2—A bimodal distribution with a $D_{50}$ of 12 μm.

The particle size distribution is shown in FIG. 1.

Electrochemical Assessment (1) Half Cell Measurements

The electrochemical properties of the carbon-coated lithium metal phosphate materials were assessed as follows:

(1) An electrode slurry was prepared by combining active material, binder (Solef 5130) and carbon black (Super P Li) at a weight ratio 90-5-5 in NMP.

(2) The electrode slurry was coated onto an aluminium carrier foil suing a doctor knife table to achieve a charge of active material amounting to 11-12 mg/$cm^2$ and then dried.

(3) The formed electrodes were tested vs a lithium metal anode using a Basytec system at ambient temperature (25° C.). The electrolyte was EC: DMC 1:1.

The half-cell testing data is provided in Table 2. This data shows that the partially agglomerated materials (Examples 1 and 2) have an improved polarisation and rate performance in comparison with the unagglomerated materials (Comparative examples 3 and 4).

TABLE 2

Half cell electrochemical testing data for Comparative Examples 1-4 and Examples 1-2.

| Example | Electrode density ($g/cm^3$) pressed @ 3 t for 1 min | C/10 capacity [mAh/g] | C/10 capacity [mAh/$cm^3$] | 4 C capacity [mAh/g] | 4 C capacity [mAh/$cm^3$] | 4 C polarisation [V] |
|---|---|---|---|---|---|---|
| Comparative Example 1 | 2.01 | 153 | 308 | 119 | 239 | 0.61 |
| Comparative Example 2 | 2.02 | 154 | 312 | 120 | 242 | 0.54 |
| Comparative Example 3 | 2.10 | 155 | 326 | 115 | 242 | 0.49 |
| Comparative Example 4 | 2.07 | 154 | 319 | 116 | 240 | 0.47 |
| Example 1 | 2.07 | 155 | 320 | 121 | 250 | 0.44 |
| Example 2 | 2.08 | 157 | 326 | 128 | 266 | 0.41 |

(2) Full Cell Measurements

Full cell properties of the carbon-coated lithium metal phosphate materials were assessed as described under half cells, but instead of Li metal, graphite was used as the anode.

The DC resistance (DCR) was measured as followed:

At first, the full cell is subjected to a formation cycle using the Basytec battery test system. The cell after formation is connected to a Parstat MC 1000 (Ametek) potentiostat where a 1 C cycle is performed and the SOC (state of charge) is adjusted to 50%. Note that the cell is maintained at room temperature (25° C.) by appropriately adjusting the temperature in the chamber.

After resting the cells for 20min, a 10 s 1 C discharge pulse at SOC 50% is applied. The voltage of the cell drops from V0 to V1 in a few milliseconds. This voltage drop (after 1 ms) ΔV0 divided by the current Δl, represents the Ohmic resistance (RO) of the cell. Further, after a few hundred milliseconds to a few seconds, owing to charge transfer reaction, the voltage decays from V1 to V2, represented by ΔV1. In our experiments, the voltage (V2) is recorded after 10 s. This resistance (ΔV0+ΔV1)/Δl is the DCR value.

To measure DCR at low temperature, the chamber with the cell is cooled over night to −20° C. Another 1 C discharge pulse is applied. The OCR value is calculated from the voltage drop and the applied current after 1 ms (Ro) and 10 seconds (DCR).

TABLE 3

Results of resistivity measurements at room temperature (RT) and at −20° C.

| Example | R0 (RT) Ω | 10 sec DCR (RT) Ω | R0 (−20° C.) Ω | 10 sec DCR (−20° C.) Ω |
|---|---|---|---|---|
| Comparative Example 1 | 13 | 30 | 29 | 124 |
| Comparative Example 2 | 15 | 23 | 25 | 115 |
| Comparative Example 3 | 13 | 29 | 26 | 109 |
| Comparative Example 4 | 12 | 25 | 26 | 115 |
| Comparative Example 5 | 9 | 22 | 24 | 115 |
| Example 1 | 7 | 18 | 20 | 92 |
| Example 2 | 8 | 19 | 19 | 97 |

The full cell electrochemical data (Table 3) shows that the increased amount of aluminium in Comparative Examples 3 and 4, and Examples 1 and 2 leads to an improvement in the low temperature DCR values. Furthermore, the formation of agglomerates of aluminium doped materials (Examples 1 and 2) further improves the low temperature DCR values in comparison with aluminium doped unagglomerated materials (Comparative Examples 3 and 4). The data also indicates that the low temperature DCR is significantly better for Examples 1 and 2 than for Comparative Example 5 (agglomerates with a high surface area produced by a milling method).

The invention claimed is:

1. A carbon-coated lithium metal phosphate, wherein:

(i) the lithium metal phosphate has a formula:

$$Li_a(Fe_{1-x}M_x)PO_4$$

in which 0.8≤a≤1.2, 0≤x≤0.1 and M is one or more of Mn, Ni, Co, Mg, or B;

(ii) the lithium metal phosphate has a crystallite size determined by Rietveld analysis of at least 100 nm and is doped with aluminium and the carbon-coated lithium metal phosphate has an aluminium content of between 300 and 5000 ppm;

(iii) the carbon-coated lithium metal phosphate has a BET surface area of less than or equal to 15 $m^2/g$; and (iv) greater than 50 vol % of the carbon-coated lithium metal phosphate is in the form of secondary particles.

2. The carbon-coated lithium metal phosphate according to claim 1, in which the aluminium content is between 900 and 3500 ppm.

3. The carbon-coated lithium metal phosphate according to claim 1, in which 0≤x≤0.05.

4. The carbon-coated lithium metal phosphate according to claim 1, comprising lithium phosphate in an amount between 0.25 and 3.5 wt % based on a total weight of the carbon-coated lithium metal phosphate.

5. The carbon-coated lithium metal phosphate according to claim 1, comprising a mixture of two particle size populations, a first population in a range of 4 to 80 μm (coarse particles) and a second population in the range 0.1 to 4 μm (fine particles) and wherein the ratio of the volume of fine particles: coarse particles is 3:97 to 50:50.

6. The carbon-coated lithium metal phosphate according to claim 1, wherein a $D_{50}$ particle size distribution is greater than or equal to 8 μm.

7. A process for the preparation of the carbon-coated lithium metal phosphate according to claim 1, the process comprising the steps of:

(i) obtaining lithium metal phosphate from a precursor mixture comprising an iron (II) source, at least one lithium source, at least one phosphate source, and at least one aluminium source under hydrothermal conditions;

(ii) mixing the lithium metal phosphate with a carbon source to provide a mixture of the lithium metal phosphate and the carbon source, and spray drying the mixture of the lithium metal phosphate and the carbon source; and (iii) heating the lithium metal phosphate and carbon source to form the carbon-coated lithium metal phosphate.

8. The process according to claim 7, wherein the aluminium source is $Al(OH)_3$ or $Al_2(SO_4)_3$*$xH_2O$.

9. A carbon-coated lithium metal phosphate obtained by a process according to claim 8.

10. An electrode for a secondary lithium ion battery comprising the carbon-coated lithium metal phosphate according to claim 1, the carbon-coated lithium metal phosphate prepared by a process comprising the steps of:

(i) obtaining lithium metal phosphate from a precursor mixture comprising an iron (II) source with at least one lithium source, at least one phosphate source, at least one aluminium source under hydrothermal conditions;

(ii) mixing the lithium metal phosphate with a carbon source to provide a mixture of the lithium metal phosphate and the carbon source, and spray drying the mixture of the lithium metal phosphate and the carbon source; and (iii) heating the lithium metal phosphate and carbon source to form the carbon-coated lithium metal phosphate.

11. A secondary lithium ion battery comprising an electrode according to claim 10.

12. A method for preparing an electrode for a secondary lithium ion battery, comprising:

(i) forming a slurry of the carbon-coated lithium metal phosphate according to claim 1; and (ii) applying the slurry to a surface of a current collector.

13. The process of claim 7, wherein the iron (II) source is further combined with at least one source of M in step (i).

14. The electrode of claim 10, wherein the iron (II) source is further combined with at least one source of M in step (i).

* * * * *